United States Patent [19]
Bridge

[11] 3,854,423
[45] Dec. 17, 1974

[54] RAIL CAR TRAILER HITCH AND CONTAINER MOUNT

[76] Inventor: John Bridge, 65 W. Jackson, Chicago, Ill. 60604

[22] Filed: Dec. 6, 1972

[21] Appl. No.: 312,660

[52] U.S. Cl....... 105/368 B, 105/366 D, 105/368 S, 248/119 S
[51] Int. Cl............................ B65j 1/24, B60p 7/08
[58] Field of Search......... 105/366 R, 366 D, 368 S, 105/368 B; 248/119 R, 119 S

[56] References Cited
UNITED STATES PATENTS
3,224,383  12/1965  Gutridge et al................. 105/366 D
3,357,371  12/1967  Gutridge......................... 105/366 D Primary Examiner—Drayton E. Hoffman
Attorney, Agent, or Firm—Hill, Gross, Simpson, Van Santen, Steadman, Chiara & Simpson

[57] ABSTRACT

A railway flatcar adapted to selectively transport either vehicular trailers or cargo containers, using a simple convertible apparatus to securely support and retain either form of lading on the flatcar and provide ease of loading and unloading thereof. A cushioning means is provided to protect against any sudden acceleration or deceleration shock forces.

12 Claims, 10 Drawing Figures

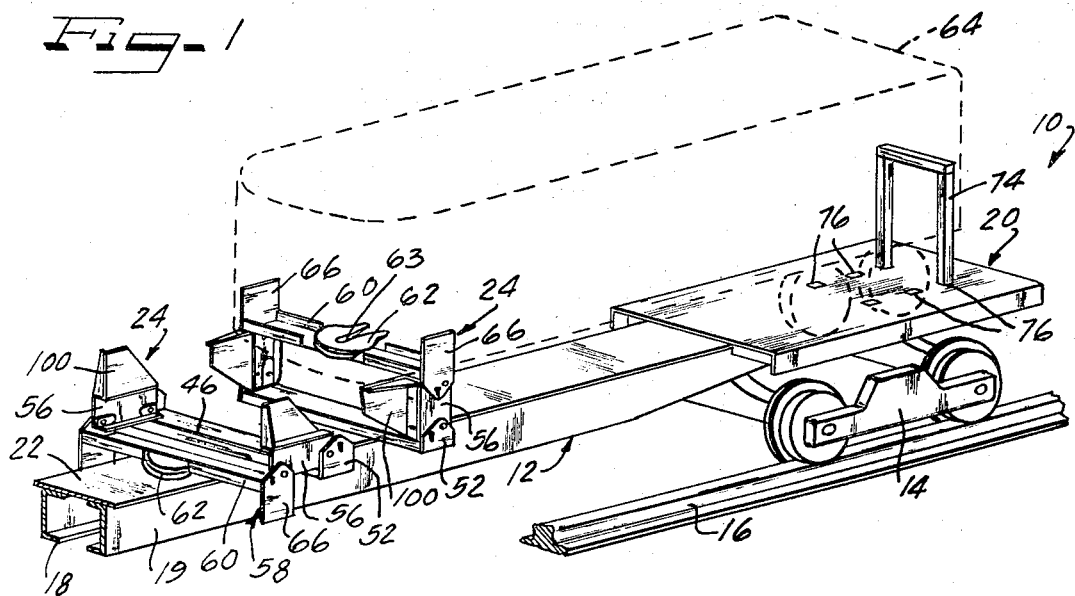
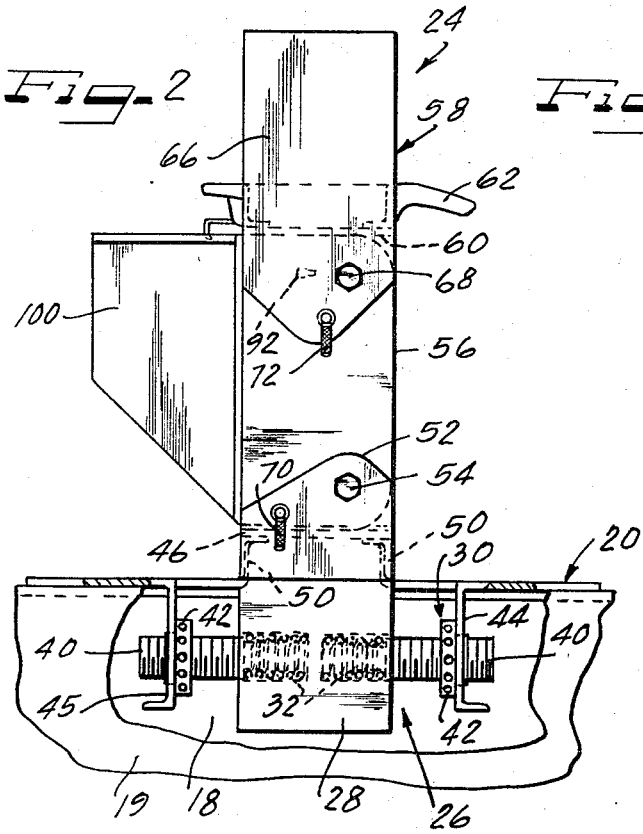
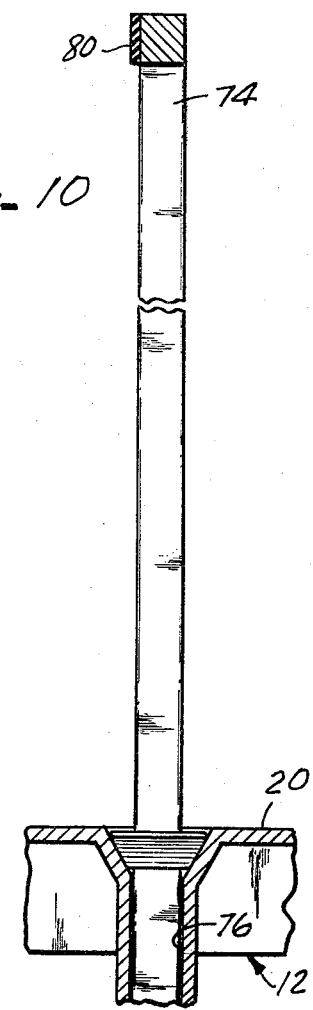

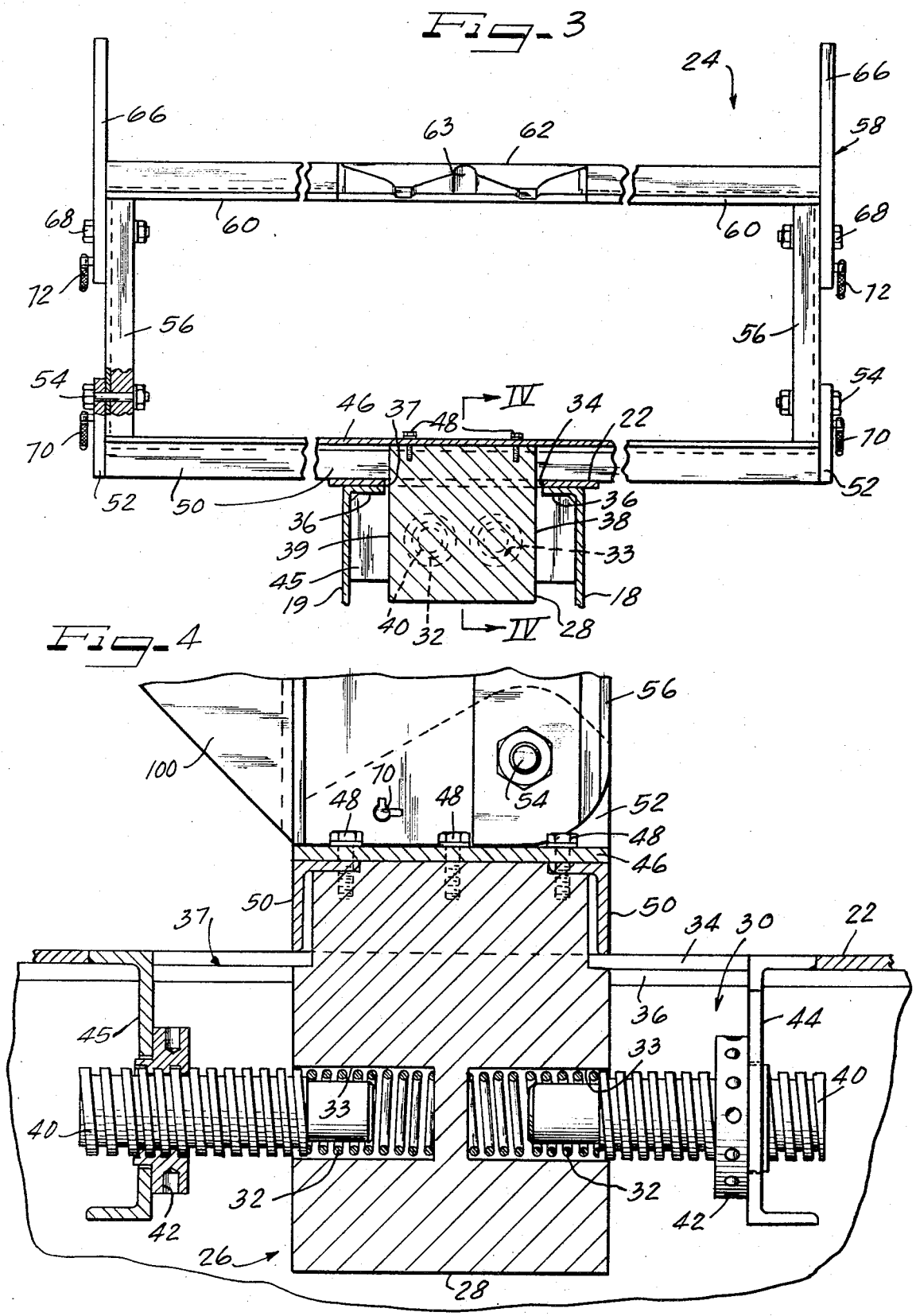

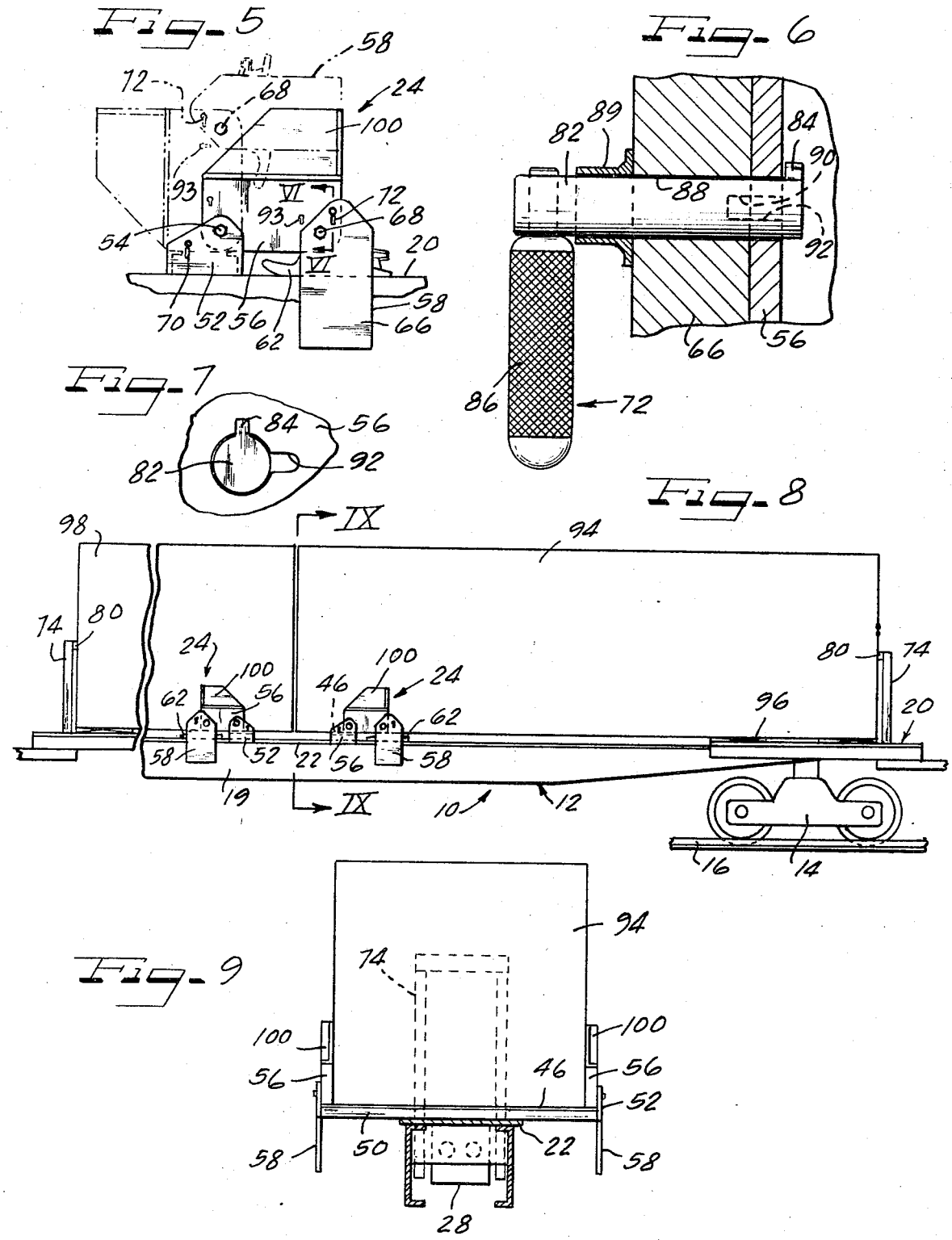

3,854,423

RAIL CAR TRAILER HITCH AND CONTAINER MOUNT

BACKGROUND OF THE INVENTION

With the increased utilization of cargo containers and with continued high volume of semitrailers shipped by rail to facilitate and reduce the cost of long distance freight transportation, it is essential to provide a railway flatcar which is adaptable to carry either highway trailers or cargo containers. In the past, flatcars were built to handle only trailers or only containers with negligible attempts to transport either type of lading with the same flatcar. One design, shown in U.S. Pat. No. 3,183,853 to Terlecky et al., provides a dual-purpose flatcar; however, it is relatively complicated and expensive, requiring considerable maintenance and adjustment and requiring separate and distinct means to support and retain the cargo container.

Further, because of the many different complex hold-down hooking and latching devices currently used to anchor containers to flatcars, the utilization of any specific type would limit a flatcar to transport only containers accepting that type of hold-down. Obviously, this still falls far short of present-day needs for a fully versatile flatcar.

SUMMARY OF THE INVENTION

The present invention is directed to a combination trailer hitch and container mount carried on a railway flatcar in which the trailer hitch is mounted on the top of an upstanding collapsible stanchion, to support and retain the kingpin of a highway semitrailer. The stanchion is movable to a retracted or collapsed position to rest generally flat along the top of the flatcar and thereby provide a mount to support a cargo container. Separate lateral retaining means for both the trailer or container ladings are formed by a portion of the stanchion structure and are brought into an effective position concurrently with positioning the stanchion to accept either a trailer or a container. Further, the stanchion is mounted on the flatcar for yieldable movement in a longitudinal plane to provide shock damping for the trailer hitch. Longitudinal container retention is provided by a simple adjustable backstop brace, whereby almost any container configuration may be transported on a flatcar constructed in accordance with the concepts of this invention. In the preferred embodiment, two stanchions are mounted at the center of a flatcar, for supporting in transit, two trailers or two containers.

The principal advantage of the invention is the provision of a railway flatcar arranged with a view towards utmost reliability and safety in retaining trailers and containers to the flatcar.

Other features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a fragmentary view in perspective of a railway flatcar having a pair of collapsible stanchions providing a mounting for a trailer or container;

FIG. 2 is a side elevational view partly in section of one of the stanchion members shown in FIG. 1, in a position to serve as a trailer hitch;

FIG. 3 is a partial section view of the hitch shown in FIG. 2;

FIG. 4 is an enlarged side sectional view taken along the line 4—4 of FIG. 3 and showing the details of the cushioning means;

FIG. 5 is a side elevational view of the stanchion shown in FIG. 1 in position to serve as a container mount;

FIG. 6 is a sectional view of the locking means for the collapsible stanchions taken along the line 6—6 of FIG. 5;

FIG. 7 is an end view of the locking means shown in FIG. 6;

FIG. 8 is a fragmentary side elevational view of a railway flatcar having its pair of collapsible stanchions supporting and retaining a pair of cargo containers;

FIG. 9 is a cross section view taken along the line 9—9 of FIG. 8; and

FIG. 10 is a cross section view showing the backstop positioned in an aperture in the flatcar deck.

DETAILED DESCRIPTION OF THE INVENTION

In the preferred embodiment of the invention, as illustrated in FIG. 1, I show a portion of railway flatcar 10 having a frame 12 supported at opposite ends by a pair of trucks 14 adapted to run on a railway track 16. Frame 12 comprises a pair of longitudinally extending and laterally spaced-apart beams 18,19 that are suitably connected together at a plurality of longitudinally spaced points and having a deck 20 mounted on top thereof. The deck 20 may be reduced in width along the center portion 22 of the flatcar 10 as currently provided on "Flexi-van" type cars. A pair of collapsible stanchions 24,24 are yieldably mounted to the center portion 22 of the flatcar frame 12 by a cushioning means 26. Cushioning means 26 includes a guide block 28 pocketed in a longitudinally extending recess 30 of the frame 12 and is biased by four springs 32, seated into bores 33 formed in opposite ends of the block 28, to a centered or neutral position within the recess 30. Recess 30 is defined by an opening 34 in the center deck portion 22 overlaying flanges 36,36 of the beams 18 and 19, whereby the flanges and deck portion provide a laterally restrictive guide-way 37 for sides 38 and 39 of the block 28. A guide shaft 40, threaded into an adjusting nut 42, extends into each of the bores 33 and adjustably compresses the centering springs 32 within the bores 33. The nuts 42 bear against spaced cross channels 44,45 extending between the beams 18,19 defining opposite ends of the longitudinally extending recess 30. Guide shafts 40 cooperate with the guide-way 37 to resist skewing or twisting movements of the guide block 28.

Each collapsible stanchion 24 comprises a laterally extending base plate 46 connected at its center to the guide block 28 by bolts 48 and having a pair of spaced angle stiffeners 50,50 secured thereto and extending the length thereof. The angle stiffeners 50,50 rest on the deck 20 and support the stanchion 24 thereon. An upstanding pivot plate 52 is secured to each end of the base plate 46 and the stiffeners 50, with each having one end of a support leg 56 pivotally connected thereto on a pivot bolt 54. The opposite ends of support legs 56,56 in turn pivotally support a hitch frame 58. The hitch frame 58 includes a laterally extending frame 60 with a hitch member or fifth wheel 62 secured at the center thereof, having a kingpin receiving slot 63 therein, and the conventional clamping means to engage and lock the kingpin (not shown) of a highway trailer 64 loaded upon the flatcar 10 and form a support and retainer for the trailer. The hitch frame 58 also has a pair of retainer plates 66,66 connected at opposite ends of the frame 60 and positioned to hold the trailer from lateral movement relative to the flatcar. Each of the retainer plates 66, as viewed in FIG. 2, has a lower portion pivotally connected to upright positioned support legs 56 by means of pivot bolts 68, and is fixed in a trailer supporting position by a lock means 72. A similar lock means 70 secures the lower end of the support legs 56 to the pivot plate 62 to provide a rigid upright stanchion 24. As seen in FIG. 1, retainer plates 66,66 extend upwardly substantially above the level of the hitch member 62, whereby a lateral safety retainer means is provided as a safeguard in the event of an accidental disconnection between the semitrailer kingpin and the fifth wheel 62. Further, a backstop member 74 is adjustably seated in an appropriate pair of a plurality of apertures 76,76 formed in the deck 20 of the flatcar 10, to provide a safety longitudinal retainer for various length highway trailers. Apertures 76 are preferably saucer-shaped, as shown in FIG. 10, to facilitate locating the legs of backstop 74 in the apertures 76. Backstop 74 is, of course, positioned sufficiently clear of the back of the trailer 64 to permit the cushioning means 26 to be fully effective yet close enough to forestall separation of the trailer from the hitch member 62. Accordingly, should the kingpin of the trailer 64 accidentally disconnect, the trailer 64 is still confined laterally and longitudinally by the retainer plates 66,66 at each side of the trailer 64, adjacent the fifth wheel 62, and by the backstop 74 at the rear of the trailer. Further, the backstop 74 will be spotted sufficiently close to the rear doors of the trailer to prevent them from being opened as a safeguard against thefts and vandalism of the trailer's contents.

Now, with reference to FIG. 5, collapsible stanchion 24 is shown in solid lines in the lowered or collapsed position preparedly to support a cargo container thereon. When it is desired to lower the stanchion 24 to the collapsed position from the upright trailer supporting positon of FIG. 2, first the lock means 72 at both sides of the stanchion are released permitting the hitch frame 58 to be pivoted downward approximately 90° about the pivot bolts 68 to the position shown in broken lines in FIG. 5, and the lock means 72 is again reset. The lock means 72 as shown in the locked position in FIGS. 6 and 7, comprise a locking bolt 82, axially shiftable in a bore 88 of the retainer plate 66, and having a key portion 84 at one end and a handle 86 at the other end. At the inner face of retainer plate 66, bore 88 is modified to a keyhole shape aperture 90 and is shown aligned with a similar keyhole aperture 92 formed in the support leg 56. It will be evident from FIGS. 6 and 7 that the locking bolt 82 can be withdrawn from the keyhole aperture 92 and pocketed into aperture 90 by the rotation of handle 86, 90° to align the key portion 84 of the locking bolt 82 with the keyhole aperture 92. A spacer bushing 89 is secured to the outer face of retainer plate 66 and aligned with the bore 88 to provide additional support for the locking bolt 82 and to limit its inward movement.

When locking bolts 82 are withdrawn from the keyhole apertures 92, retainer plates 66 of the hitch frame 58 may be rotated about the pivot bolt 68. A second keyhole aperture 93, formed in each of the support legs 56, is alignable with the bore 88 and receives locking bolt 82 when the hitch frame is in the upright trailer supporting position of FIG. 2.

Again referring to FIG. 5, the support legs 56 are now pivoted about the bolts 54 from the dotted line position to the solid line position by first disconnecting the lock means 70 in the same manner described above for the locking means 72 and lowering the support legs 56 and hitch frame 58 to the collapsed position. Whereupon, the fifth wheel trailer support surface of the hitch frame 58 will rest face down on the deck 20 of the flatcar 10 to provide a cargo container support in cooperation with the base plate 46. Further, the support legs 56 positioned adjacent to each side wall of the container 94 at one end thereof, as shown in FIG. 8, provide lateral retention for the container. Support legs 56 extend vertically well above the container supporting surface at each side of base plate 46 and hitch frame 58 to laterally secure the cargo container therebetween (see FIG. 9). An added safeguard for lateral stability is provided by an extension member 100 secured to each of the support legs 56 to substantially increase the retaining height of each support leg 56.

The other end of container 94 may be suppported on a platform supported structure 96 or laterally extending planks to level the container and provide clearance between flatcar and container to facilitate loading and unloading.

With the preferred apparatus disclosed, the highway trailers and cargo containers are loaded on the flatcars with the aid of hoist means (not shown) as is presently available in most rail freight yards.

Longitudinal retention is provided by loading a pair of cargo containers 94,98 on the flatcar 10 with adjacent ends in abutment with one another and positioning a backstop member 74 against each of the container ends opposite the ends in abutment. Thus, each of the backstops 74 will provide longitudinal restraint for both cargo containers 94,98 in one direction. Bumper cushions 80 are provided for each backstop member 74 to protect the lading against acceleration and deceleration shock forces.

It should be understood that the fifth wheel 62 is of a conventional construction adapted to support highway trailers on flatcars having collapsible trailer supports and lock the kingpin in position. One form of fifth wheel may be of a type similar to that shown and described in U.S. Pat. No. 3,346,223 to Keith W. Broling, and well-known to those skilled in the art, so not herein shown or described in detail.

From the preceding description, it will be apparent that a combination safety vehicular trailer hitch and cargo container mount for use with railway flatcars has been provided. It will also be apparent that both cargo containers and semitrailers are provided with effective lateral and longitudinal retention to secure both types of lading to the flatcar so that no other elaborate or limiting type of anchoring hold-down means is required. Accordingly, a flatcar constructed in accordance with the principles of this invention may be used to transport almost any length trailer and most all cargo containers without regard to the varied styles of hold-down means encountered.

I claim:

1. A combination trailer hitch and container mount, carried on a railway flatcar comprising:

a collapsible stanchion means having a hitch means arranged to secure and support the kingpin of a vehicular highway trailer carried on the flatcar when said collapsible stanchion is in an upright, non-collapsed position and having a container mount means arranged to retain and support a cargo container carried on the flatcar when said collapsible stanchion is in a lowered, collapsed position, said collapsible stanchion means being mounted on said railway flatcar and having a cushioning means for limited yieldable movement along a longitudinal plane and being substantially restricted in a lateral plane, said hitch means comprised of a laterally extending hitch frame having a retainer plate secured to each of opposite ends thereof and arranged to laterally retain said highway trailer, and said container mount means comprises a laterally extending base plate having a support leg connected at each end thereof, arranged to laterally retain said cargo container.

2. A combination trailer hitch and container mount according to claim 1, wherein said hitch means is pivotally connected to said support legs and said support legs are pivotally connected to said base plate, and wherein lock means are provided to secure the collapsible stanchion in an upright, non-collapsed position.

3. A combination trailer hitch and container mount according to claim 1, wherein said hitch frame cooperates with said base plate to support said cargo container when said hitch frame is in a collapsed position.

4. A combination trailer hitch and container mount according to claim 3, wherein an adjustable backstop member secured to said flatcar is arranged to longitudinally retain the cargo container.

5. A combination trailer hitch and container mount according to claim 4, wherein a pair of collapsible stanchion means are carried adjacent the center of said flatcar to support and retain thereon either a pair of cargo containers or a pair of highway trailers.

6. A railway flatcar adapted to selectively transport a vehicular trailer or a cargo container comprising:

A frame having a generally flat deck and mounted on wheels for movement along railway tracks:

A collapsible stanchion means including a laterally extending base plate mounted to said flatcar frame and adapted to support a cargo container, said base plate having a pivot plate secured to each of opposite ends thereof;

A support leg pivotally connected at one end to each of the pivot plates and fixedly located in either an upright supporting position or in a lowered collapsed position;

A laterally extending hitch frame having a retainer plate secured to each of opposite ends thereof, each of said retainer plates being pviotally connected to a second end of said support legs, said hitch frame being fixedly located in either an upright supporting position or a lowered collapsed position. said hitch frame also having a hitch member for receiving and holding the kingpin of a vehicular trailer carried on the flatcar when said hitch frame is located in the upright position.

7. A railway flatcar according to claim 6, wherein the pair of support legs, when in the collapsed position, cooperate with said base plate to provide a cargo container retaining and support means, and wherein the retainer plates of the hitch frame, when in the upright non-collapsed position, cooperate with the hitch member to provide a trailer retaining and support means.

8. A railway flatcar according to claim 7, wherein the said base plate is mounted on the flatcar frame with a cushioning means for limited yieldable longitudinal movement whereby draft and buff impact forces experienced by the hitch member may be relieved.

9. A railway flatcar according to claim 8, wherein the said cushioning means comprises a guide block secured to said base plate and extends downward into a longitudinally extending recess formed in the flatcar frame, arranged to restrict lateral movement of the guide block and spring biasing means to center said guide block relative to said longitudinally extending recess, whereby impact forces are cushioned by said spring biasing means.

10. A railway flatcar according to claim 9, wherein each support leg is provided with an extension to cooperate with said leg when in the collapsed position to retain the cargo container to the flatcar.

11. A railway flatcar according to claim 10, wherein a backstop member, adjustably fixed to said flatcar frame, is arranged to longitudinally retain the cargo container to the flatcar.

12. A railway flatcar according to claim 11, wherein a pair of collapsible stanchion means are mounted on the flatcar at a location intermediate its ends to support and laterally retain a pair of abutting cargo containers and a backstop member is adjustably positioned against each cargo container adjacent each end of said flatcar.

* * * * *